(12) United States Patent
Buschbeck et al.

(10) Patent No.: US 12,266,464 B2
(45) Date of Patent: Apr. 1, 2025

(54) MAGNETIC SHEET STACK, METHOD FOR MANUFACTURING A MAGNETIC SHEET STACK AND ELECTRIC MACHINE

(71) Applicant: Siemens Aktiengesellschaft, Munich (DE)

(72) Inventors: Jörg Buschbeck, Nuremberg (DE); Gotthard Rieger, Munich (DE); Carsten Schuh, Baldham (DE); Thomas Soller, Bayern (DE); Rolf Vollmer, Gersfeld (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 711 days.

(21) Appl. No.: 17/608,562

(22) PCT Filed: Apr. 16, 2020

(86) PCT No.: PCT/EP2020/060661
§ 371 (c)(1),
(2) Date: Nov. 3, 2021

(87) PCT Pub. No.: WO2020/224927
PCT Pub. Date: Nov. 12, 2020

(65) Prior Publication Data
US 2022/0230799 A1    Jul. 21, 2022

(30) Foreign Application Priority Data
May 6, 2019   (EP) .................................. 19172809

(51) Int. Cl.
H01F 27/28   (2006.01)
H01F 17/00   (2006.01)
(Continued)

(52) U.S. Cl.
CPC ..... *H01F 27/2804* (2013.01); *H01F 17/0013* (2013.01); *H02K 1/04* (2013.01);
(Continued)

(58) Field of Classification Search
None
See application file for complete search history.

(56) References Cited

U.S. PATENT DOCUMENTS

| | | | |
|---|---|---|---|
| 2013/0154434 A1 | 6/2013 | Hasegawa | 310/216.004 |
| 2018/0358868 A1 | 12/2018 | Chang | H02K 11/01 |

(Continued)

FOREIGN PATENT DOCUMENTS

| | | | |
|---|---|---|---|
| CN | 103166385 A | 6/2013 | H02K 1/12 |
| CN | 107578879 A | 1/2018 | C08K 3/36 |

(Continued)

OTHER PUBLICATIONS

Search Report for International Application No. PCT/EP2020/060661, 14 pages.
Chinese Office Action, Application No. 202080033654.8, 7 pages.

*Primary Examiner* — Bernard Rojas
(74) *Attorney, Agent, or Firm* — Slayden Grubert Beard PLLC

(57) ABSTRACT

Various embodiments of the teachings herein include a magnetic sheet stack for an electric machine comprising: a plurality of magnetic sheets electrically insulated from one another by being spaced apart from one another predominantly with a non-vanishing clearance; a respective set of ceramic spacers distributed between each of the plurality of magnetic sheets from an adjacent sheet in the stack; and a respective gas layer filling a gap between a predominant part of a planar extent of each of the plurality of magnetic sheets allowing a cooling fluid to be circulated between the adjacent sheets.

10 Claims, 2 Drawing Sheets

(51) Int. Cl.
 *H02K 1/04* (2006.01)
 *H02K 15/02* (2006.01)
(52) U.S. Cl.
 CPC ..... *H02K 15/02* (2013.01); *H01F 2027/2809* (2013.01); *H02K 2213/03* (2013.01)

(56) References Cited

U.S. PATENT DOCUMENTS

2019/0214180 A1  7/2019  Yoon et al.
2019/0305616 A1  10/2019  Bittner .................... H02K 1/24

FOREIGN PATENT DOCUMENTS

| CN | 109690707 A | 4/2019 | ............. H01F 10/00 |
| EP | 3 255 758 | 12/2017 | ............... H02K 1/24 |
| WO | 2007/146422 A2 | 12/2007 | ............. H02K 27/02 |
| WO | 2011 101985 | 8/2011 | ............... H02K 3/34 |
| WO | 2019 008722 | 11/2019 | ............... H02K 3/34 |

MAGNETIC SHEET STACK, METHOD FOR MANUFACTURING A MAGNETIC SHEET STACK AND ELECTRIC MACHINE

CROSS-REFERENCE TO RELATED APPLICATIONS

This application is a U.S. National Stage Application of International Application No. PCT/EP2020/060661 filed Apr. 16, 2020, which designates the United States of America, and claims priority to EP Application No. 19172809.6 filed May 6, 2019, the contents of which are hereby incorporated by reference in their entirety.

TECHNICAL FIELD

The present disclosure relates to electric machines. Various embodiments of the teachings herein include magnetic sheet stacks, methods for manufacturing magnetic sheet stacks, and/or electric machines.

BACKGROUND

Electric machines may include rotors and stators which comprise magnetic sheet stacks. Magnetic sheet stacks are typically manufactured by introducing thin, electrically insulating (polymer) layers between the individual magnetic sheets of the magnetic sheet stack. The purpose of such insulating layers is to suppress the development of eddy currents and ensure a design with sufficient mechanical stability. With magnetic sheet stacks of this kind, however, a thermal load on the magnetic sheets of the magnetic sheet stack limits the practical use thereof.

SUMMARY

The teachings of the present disclosure include an improved magnetic sheet stack compared to the prior art, which has in particular a higher temperature load capacity. For example, some embodiments include a magnetic sheet stack for an electric machine with a plurality of magnetic sheets (20) which are electrically insulated from one another by being spaced apart from one another predominantly with a non-vanishing clearance, in which the magnetic sheets (20) are spaced apart from one another by means of several intermediately disposed spacers (30), wherein the spacers (30) are formed with ceramic particles, such that the magnetic sheets (20) of the magnetic sheet stack are electrically insulated from one another over the predominant part of their planar extents in each case by an intermediately disposed gas layer, in which in each case a defined gap is implemented between two magnetic sheets, as a result of which the magnetic sheet stack can be cooled with a cooling fluid.

In some embodiments, an air gap is implemented between two magnetic sheets, as a result of which the magnetic sheet stack can preferably be cooled by means of cooling air.

In some embodiments, the ceramic particles are held in a force-fit manner between the magnetic sheets (20).

In some embodiments, a spacer or spacers (30) is or are formed with aluminum oxide and/or zirconium oxide and/or magnesium oxide and/or yttrium oxide and/or boron nitride and/or yttrium aluminum garnet and/or silicon nitride and/or silicon dioxide.

In some embodiments, the particles have a diameter of no more than 300 micrometers, in particular of no more than 100 micrometers and/or no more than 50 micrometers.

In some embodiments, the diameters of the particles have a size distribution which is a monomodal or at least approximately Gaussian distribution with a mean value of at least 0.5 micrometers and/or no more than 20 micrometers, with a mean value of at least one micrometer and/or no more than 6 micrometers, with a mean value of at least 2 micrometers and/or no more than 4 micrometers.

In some embodiments, the particles are embodied to be essentially spherical.

As another example, some embodiments include a method for manufacturing a magnetic sheet stack as described herein, in which magnetic sheets (20) are used, a suspension having the ceramic particles is used, and the suspension is deposited onto one or several magnetic sheets (20), after which the magnetic sheets (20) are stacked and, during or after stacking, are pressed or packaged together.

In some embodiments, the depositing is carried out by spraying and/or printing the suspension and/or by dipping the magnetic sheet or sheets (20) into the suspension.

As another example, some embodiments include an electric machine with a magnetic sheet stack (10) and/or manufactured according to a method as described herein.

BRIEF DESCRIPTION OF THE DRAWINGS

The teachings of the present disclosure are explained in more detail below with reference to an exemplary embodiment specified in the drawings, in which.

DETAILED DESCRIPTION

Figure 1:
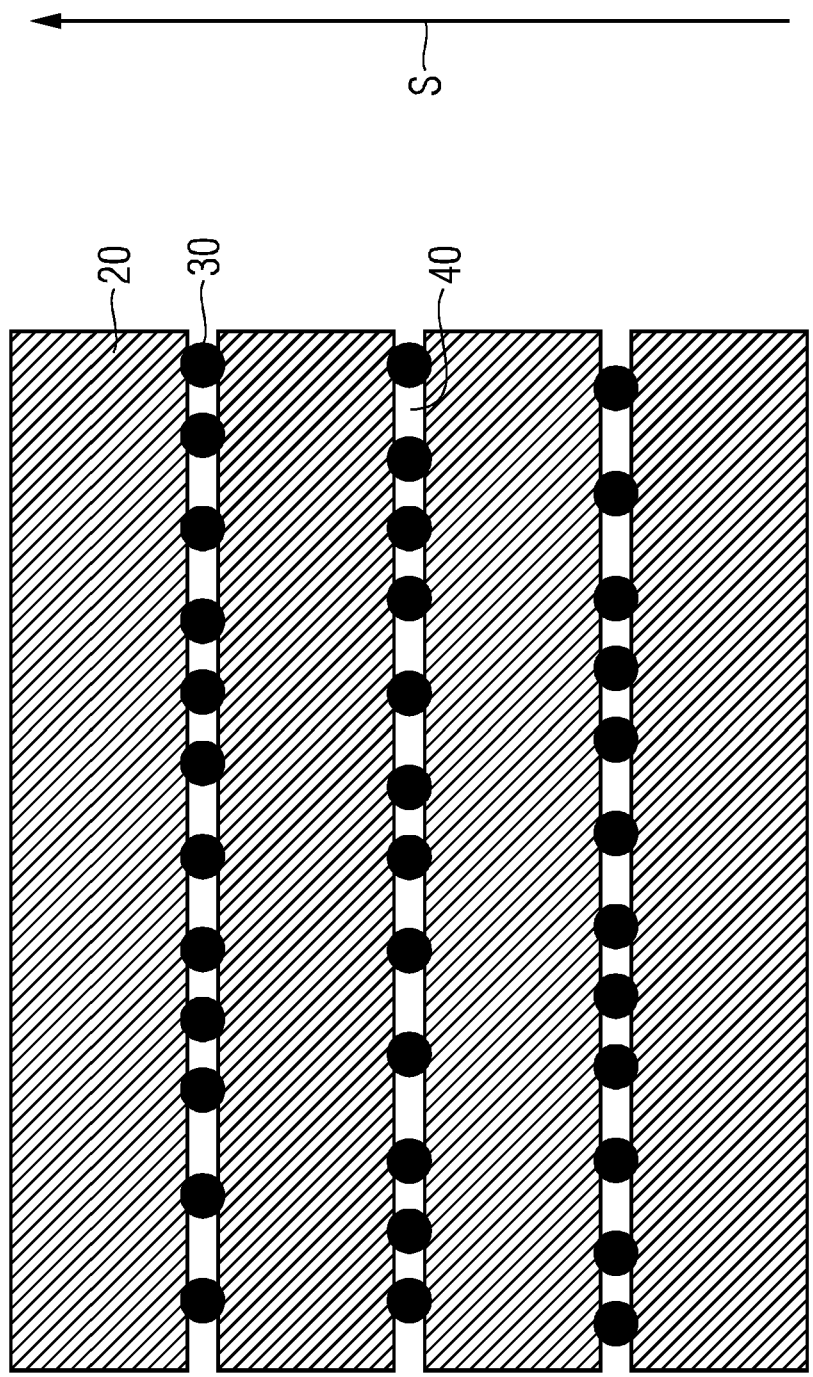
FIG. 1 shows a cross-sectional schematic representation of a magnetic sheet stack incorporating teachings of the present disclosure.

The present disclosure describes magnetic sheet stacks formed with a plurality of magnetic sheets which are electrically insulated from one another by being spaced apart from one another predominantly with a non-vanishing clearance. A spacing apart of the magnetic sheets predominantly with a non-vanishing clearance is to be understood to mean that the magnetic sheets of the magnetic sheet stack do not rest with the predominant area portion of their flat sides, which face toward adjacent magnetic sheets, on components disposed between the magnetic sheets, but instead the predominant area portion of the flat sides together with adjacent magnetic sheets encloses a clearance which is greater than zero. The predominant area portion is expediently an area portion which exceeds half of the total area, a 90 percent area portion, and/or an at least 98 percent area portion.

In some embodiments, the magnetic sheets are electrically insulated from one another as a result of their being spaced apart with a predominantly non-vanishing clearance such that no separate insulating materials must be provided in the solid aggregate state between the magnetic sheets of the magnetic sheet stack. In the magnetic sheet stacks, a particularly high temperature stability is consequently made possible on account of the possibility to dispense with insulating materials. Expediently, over the predominant part of the planar extent of the magnetic sheets, only a gas layer, in particular an air layer, is present therebetween. In the magnetic sheet stacks, the magnetic sheets are electrically insulated from one another only by an air layer, in particular of a homogeneous thickness, disposed therebetween in each case on account of their being spaced apart over the predominant part of their planar extents. For this reason, it is possible to dispense with further insulation materials, such as organic insulation layers such as in particular enamels. It is thus possible to achieve a particularly high temperature load capacity of the magnetic sheet stack. On account of the spacing between the magnetic sheets of the magnetic sheet stack, which can be set in a defined manner, further degrees of freedom are opened up in the design of the magnetic sheet stack.

In some embodiments, the magnetic sheets are spaced apart from one another by means of one or several intermediately disposed spacers. A defined gap between the magnetic sheets can be implemented by means of the spacers between two magnetic sheets. As a result, the magnetic sheets can be cooled through the gaps with a cooling fluid, e.g. cooling air. At the same time, the magnetic sheet stack has a particularly high mechanical stability on account of the spacers provided.

In some embodiments, the spacer or spacers in the magnetic sheet stack is/are formed with or from ceramic. Spacers formed with ceramic can provide a high degree of electrical insulation and at the same time a high degree of mechanical stability, so that a particularly high electrical temperature load capacity is enabled.

In some embodiments, the spacer or spacers is or are formed with aluminum oxide and/or zirconium oxide and/or magnesium oxide and/or yttrium oxide and/or boron nitride and/or yttrium aluminum garnet and/or silicon nitride and/or silicon dioxide. Precisely the aforementioned materials enable spacers with particularly strong electrically insulating and at the same time mechanically highly stable characteristics, so that a magnetic sheet stack with a high temperature load capacity can be implemented.

In some embodiments, the spacer or spacers is/are formed with particles of electrically insulating material. With particles of electrically insulating material, in particular with particles in the micrometer range, it is easily possible to implement a defined air gap with a width of a fraction of a micrometer or of a few micrometers in order to avoid the development of eddy currents. At the same time, the arrangement of such spacers is particularly easily possible, since only a sufficiently high density for the reliable spacing of the magnetic sheets must be achieved. A precise positioning of the spacers on the magnetic sheets in the manner of a controlled micromanipulation, on the other hand, is not expressly required. Ceramic particles thus form particularly easily deployable spacers in the relevant spacing range of a few micrometers according to the invention. The concentration of particles can also be set freely so that the spacing of the magnetic sheets of the magnetic sheet stack can be set and tailored freely.

In some embodiments, the particle or particles is or are formed with ceramic particles. Ceramic particles with a size of a few micrometers embody particularly hard and highly stable spacers which permit a high temperature load.

In some embodiments, the particle or particles are embodied to be essentially spherical. Spherical particles make it easily possible to achieve a controlled spacing of magnetic sheets, as with spherical particles a controlled alignment of these particles on magnetic sheets is not required on account of the isotropy of the spherical form. The particles particularly may have an essentially spherical form. An essentially spherical form is to be understood to mean a form with a radius which varies by no more than 20 percent in different spatial directions. In some embodiments, the radius varies particularly by no more than 10 percent and/or by no more than 5 percent. In some embodiments, the particles particularly have a non-splintered and/or a non-spattered and/or a non-fibrous and/or a non-plate-like form.

In some embodiments, the particles have a diameter of no more than 300 micrometers and/or of no more than 100 micrometers. In some embodiments, the particles have a diameter of no more than 50 micrometers. In some embodiments, the diameters of the particles have a size distribution which is a monomodal or at least approximately Gaussian distribution and/or has a mean value of at least 0.5 micrometers and/or no more than 20 micrometers, of at least one micrometer and/or no more than 6 micrometers, and/or of at least 2 micrometers and/or no more than 4 micrometers.

A diameter of a particle within the context of the present disclosure means a maximum diameter of the particle, in other words the greatest dimension of the particle in one spatial direction. A diameter of a particle can be understood within the context of this disclosure to mean an effective diameter of the particle, in other words a diameter averaged over all spatial directions. A diameter of a particle means a minimum diameter of the particle, in other words the smallest dimension of the particle along one spatial direction.

In some embodiments, the diameters of the particles are distributed with a distribution function which has a standard deviation of no more than 5 micrometers, no more than 3 micrometers, and/or no more than one micrometer.

In some embodiments, methods for manufacturing a magnetic sheet stack incorporating teachings of the present disclosure, magnetic sheets and a suspension containing particles of insulating material are used. In some embodiments, the suspension is deposited onto one or more magnetic sheets, after which the magnetic sheets are stacked. It is consequently not necessary to expressly microposition spacers individually. On the contrary, it is sufficient for the spacers to be held in the form of particles formed with electrically insulating material in a suspension and deposited as a suspension onto the magnetic sheets.

In some embodiments, the suspension can contain binders, which effect a certain adhesion of the particles once they have been deposited onto the magnetic sheets. In some embodiments, the particles are spherical particles and ceramic particles as described above. By means of ceramic particles, a mechanical stability of the magnetic sheet stack is also very easily ensured.

In some embodiments, the depositing is carried out by spraying and/or printing the suspension and/or by dipping the magnetic sheets into the suspension.

In some embodiments, the magnetic sheets are pressed or packaged together during or after stacking. By means of the pressing or packaging of the magnetic sheets, the particles are held between the magnetic sheets in a force-fit manner and where appropriate also in a form-fit manner such that the particles are held between the magnet sheets in a mechanically extremely stable manner.

In some embodiments, ab electric machine is an electric motor and/or an electric generator and has a magnetic sheet stack as described above, in particular manufactured according to a method as described above. In some embodiments, the electric machine has a stator and/or a rotor with in each case a magnetic sheet stack as described herein.

FIG. 1 shows a magnetic sheet stack 10 incorporating teachings of the present disclosure. The magnetic sheet stack 10 comprises a plurality of magnetic sheets 20, which are essentially planar flat parts having flat sides which are parallel to one another. The magnetic sheets 20 are spaced apart from one another by means of ceramic particles 30, which are disposed between the magnetic sheets 20 and are in contact therewith. The ceramic particles 30 each have a spherical form with a diameter of 40 micrometers.

Here, the ceramic particles 30 have a very homogeneous size distribution with respect to one another, in other words the diameters of the ceramic particles have an approximately Gaussian distribution with a mean value of 3 micrometers and a standard deviation of 1.5 micrometers. In further embodiments not shown separately, ceramic particles having a diameter of more than 5 micrometers and less than one micrometer are additionally filtered out. The ceramic particles 30 thus function to a certain extent as spacers between two adjacent magnetic sheets 20 and hold the magnetic sheets apart from one another at an average distance of approximately 2.5 micrometers, as the ceramic particles are pressed lightly into the metal surfaces when the stack is pressed. In further embodiments not shown separately, which in all other respects correspond to that shown, the ceramic particles can also have a monomodal size distribution.

In some embodiments, the ceramic particles 30 are formed from aluminum oxide. In some embodiments, the ceramic particles 30 are formed with or from zirconium oxide and/or magnesium oxide and/or yttrium oxide and/or boron nitride and/or yttrium aluminum garnet and/or silicon nitride and/or silicon dioxide.

In some embodiments, the magnetic sheets 20 are punched or manufactured in some other manner, for example by means of screen printing and/or stencil printing and subsequent sintering. Then the ceramic particles 30 can be introduced between the magnetic sheets 20 as follows:

A suspension having the ceramic particles 30 is used for this purpose. An aqueous suspension having the ceramic particles 30 is used for this purpose, for example. In some embodiments, the ceramic particles 30 can be introduced by means of a suspension of the ceramic particles 30 in an organic solvent. Binders and dispersants are optionally added to the suspension.

The suspension having the ceramic particles 30 is applied onto the magnetic sheets 20 by means of spraying or dipping or printing, after which the next method step of drying the suspension and hardening is carried out. The hardening step may also be dispensed with, depending on the binder optionally selected for the suspension.

Then the magnetic sheets 20 are stacked one on top of the other and pressed together in the direction perpendicular to the flat sides of the magnetic sheets 20, in other words in the stacking direction S. Here, the individual ceramic particles 30 are pressed mechanically into the flat sides of the magnetic sheets 20. In the case of the optionally used binders, the ceramic particles 30 additionally remain fixed on the flat sides of the magnetic sheets 20 by way of the binder which functions as an adhesive. In this way, the ceramic particles 30 remain fixed in a form-fit and force-fit manner between the magnetic sheets 20, even when subject to high operating loads. In some embodiments, the magnetic sheets 20 can be pressed in some other manner.

Figure 2:
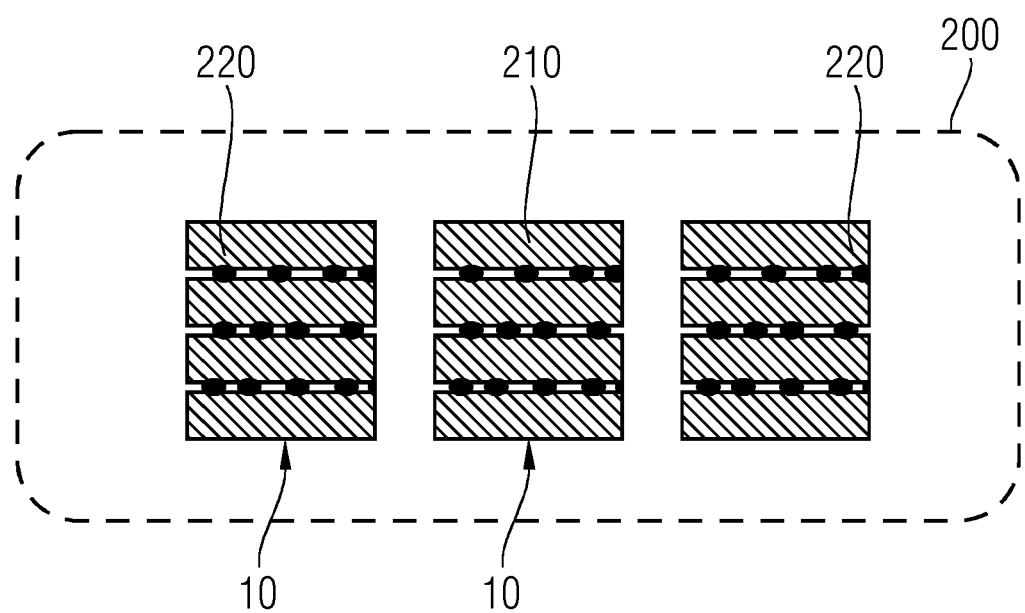
FIG. 2 shows a schematic sketch of an electric machine incorporating teachings of the present disclosure.

The electric machine 200 shown in FIG. 2 comprises a stator 210 and a rotor 220. Both the stator 210 and the rotor 220 of the electric machine are formed in each case with a magnetic sheet stack 10 manufactured as described above.

What is claimed is:

1. A magnetic sheet stack for an electric machine, the sheet stack comprising:
    a plurality of magnetic sheets electrically insulated from one another by being spaced apart from one another predominantly with a non-vanishing clearance;
    a respective set of ceramic spacers distributed between each of the plurality of magnetic sheets from an adjacent sheet in the stack; and
    a respective gas layer filling a gap between a predominant part of a planar extent of each of the plurality of magnetic sheets allowing a cooling fluid to be circulated between the adjacent sheets.

2. The magnetic sheet stack as claimed in claim 1, wherein the respective gas layer comprises air.

3. The magnetic sheet stack as claimed in claim 1, wherein the ceramic spacers are held in a force-fit manner between adjacent sheets of the stack.

4. The magnetic sheet stack as claimed in claim 1, wherein the spacers comprise aluminum oxide and/or zirconium oxide and/or magnesium oxide and/or yttrium oxide and/or boron nitride and/or yttrium aluminum garnet and/or silicon nitride and/or silicon dioxide.

5. The magnetic sheet stack as claimed in claim 1, wherein spacers comprise particles of electrically insulating material.

6. The magnetic sheet stack as claimed in claim 1, wherein the particles have a diameter of no more than 300 micrometers.

7. The magnetic sheet stack as claimed in claim 6, wherein diameters of the particles have a size distribution which is a monomodal or at least approximately Gaussian distribution with a mean value of at least 0.5 micrometers and/or no more than 20 micrometers.

8. The magnetic sheet stack as claimed in claim 1, wherein the particles are essentially spherical.

9. A method for manufacturing a magnetic sheet stack, the method comprising:
    distributing a suspension of ceramic particles onto one or more magnetic sheets;
    stacking the magnetic sheets to form the magnetic sheet stack; and
    pressing the stacked magnetic sheets together.

10. The method as claimed in claim 9, wherein distributing the suspension includes spraying and/or printing the suspension and/or dipping the magnetic sheets into the suspension.

* * * * *